United States Patent [19]

Pope

[11] 3,727,034
[45] Apr. 10, 1973

[54] COUNTING SYSTEM FOR A PLURALITY OF LOCATIONS

[75] Inventor: Joseph T. Pope, Lynchburg, Va.
[73] Assignee: General Electric Company, Lynchburg, Va.
[22] Filed: Jan. 19, 1972
[21] Appl. No.: 218,993

[52] U.S. Cl. ........235/92 LG, 235/92 R, 235/92 EV, 235/92 ST, 235/92 TC
[51] Int. Cl. .......................G06m 3/08, H03k 21/02
[58] Field of Search ....................235/92 TC, 92 LG, 235/92 EV, 92 ST, 92 PK

[56] References Cited

UNITED STATES PATENTS

| | | | |
|---|---|---|---|
| 3,648,027 | 3/1972 | Ganong | 235/92 ST |
| 3,141,612 | 7/1964 | Bolton | 235/92 TC |
| 3,593,006 | 7/1971 | McGee | 235/92 PK |

Primary Examiner—Maynard R. Wilbur
Assistant Examiner—Robert F. Gnuse
Attorney—James J. Williams et al.

[57] ABSTRACT

This system provides an accurate count of people or objects moving in opposite directions at each of a plurality of locations. The system includes two spaced scanners at each location to provide signals that indicate the direction of movement. The scanner signals are applied to logic circuits that produce an up (or on) signal, or a down (or off) signal, depending upon the direction of movement. Sequential timing signals are provided so that each up or down signal is sequentially produced, even though the scanner signals at two or more different locations may occur simultaneously.

6 Claims, 2 Drawing Figures

COUNTING SYSTEM FOR A PLURALITY OF LOCATIONS

BACKGROUND OF THE INVENTION

My invention relates to a system for counting the movement of people or objects at a plurality of locations, and particularly to such a system that can count simultaneous movements at two or more of the locations, and movement in two directions at each of the locations.

Systems for counting the movement of people or objects are needed for various reasons. One reason, which resulted in this invention, is to count the number of people getting on or off a public conveyance, such as a bus. This count is transmitted to dispatchers, who can then dispatch additional buses to those routes where the count indicates crowded conditions, or who can remove buses from those routes where the count indicates excess buses in service. Systems have been devised to provide such counts, but such systems have, in my opinion, had various disadvantages. For example, where, as is the usual case, there are a plurality of locations at which people can get on and off a bus, the systems I am aware of have not been able to count accurately. And this is particularly true when there is or can be simultaneous movement past scanners at two or more separate locations. Other systems I am aware of are not well adapted to be used on a bus, and require excessive or intolerable amounts of space or scanner separations for the system. And still other systems I am aware of are not particularly well adapted to supply separate and distinct count-up signals (representing people getting on a bus), or count-down signals (representing people getting off a bus) for quick use by dispatchers and computers.

Accordingly, a principal object of my invention is to provide a new and improved system that can accurately count simultaneous movement of people (or objects) past scanners at each of a plurality of different locations.

Another object of my invention is to provide a new and improved counting system that is easily used in locations, particularly a public bus, which are relatively small and which present relatively severe operating conditions.

Another object of my invention is to provide a new and improved counting system that is well adapted to supply public transportation passenger information in a form that can be quickly used by a dispatcher with the aid of a computer in short-term or long-range scheduling.

And, a relatively specific object of my invention is to provide a new and better passenger counting system for use on buses.

SUMMARY OF THE INVENTION

Briefly, these and other objects are achieved in accordance with my invention by a system that uses two spaced scanners at each location at which a count is to be made. The scanners supply respective signals indicating the direction a person moves past the scanners, such as either on or off of a bus. These signals are applied to a logic circuit that senses the order of the signals and, at a time determined by a separate pulse supplied in sequence for each location, produces a signal at one of two outputs to indicate the direction of movement. Signals from each location that indicate people getting on may be added in an up-down counter, and signals from each location that indicate people getting off may be subtracted in the up-down counter. The separate pulse in sequence ensures that simultaneous movements at two or more locations are counted in sequence so that people moving past scanners at two locations at the same time are accurately counted.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawings, in which:

DESCRIPTION OF THE PREFERRED EMBODIMENT

Figure 1:
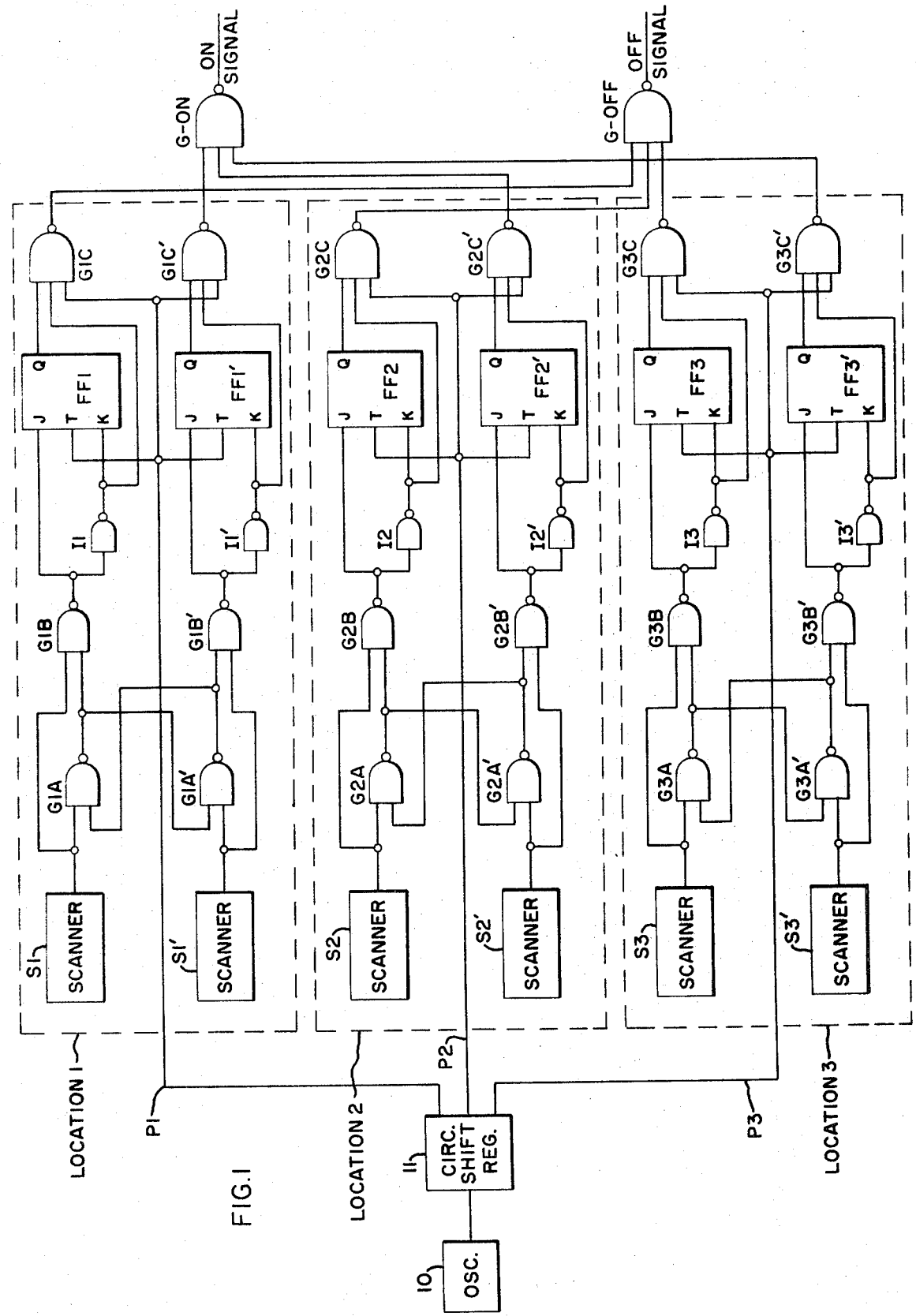
FIG. 1 shows an electrical circuit diagram of a preferred embodiment of my counting system.

In FIG. 1, I have shown a counting system in accordance with my invention which I contemplate would be used in a bus or other device having three locations at which passenger movements in both directions are to be counted. While I have shown a system for counting passengers getting on or off a bus at three locations, it is to be understood that my invention can be used in applications for counting objects or for counting at more or less than three locations. In my system, I provide an oscillator 10 which produces repetitive pulses having a selected frequency (5,000 Hertz, for example) and a selected duration (100 microseconds, for example). These pulses are supplied to a circulating shift register 11 which has a pulse output for each of the three locations. These outputs are designated P1, P2, and P3, and produce respective pulses in sequence. Thus, the first, fourth, seventh, and so on pulses appear at the output P1; the second, fifth, eighth, and so on pulses appear at the output P2; and the third, sixth, ninth, and so on pulses appear at the output P3. The oscillator 10 and the circulating shift register 11 are common to the entire system. At each location, I utilize logic circuits, each of which is respectively shown enclosed in the dashed lines. The logic elements for each location are similar, and use corresponding designations. Thus, scanners are indicated by the legend S followed by a number; gates are designated by the legend G followed by a number and a letter; inverters are designated by the legend I followed by a number; and multivibrators or flip-flops are designated by the legend FF followed by a number. The logic circuit for location 1 is shown in the upper dashed line rectangle, and utilizes presence sensors or scanners S1, S1'. The scanners S1, S1' are positioned at location 1 to sense the movement of a person or object. A typical installation of a scanner includes a light source and a light sensing device arranged so that when a person or object passes between the source and sensing device, the light sensing device produces a signal (a logic 1) in response to the absence of light. The scanners are also spaced close enough (an advantage from a space utilization standpoint) so that the person or object will be between both light sources and their respective sensing devices simultaneously, even if for a short time. (In one experimental installation using my invention, the scanners were separated approximately 3 inches.) Thus, the two scanners S1, S1' produce a first signal only, then a second signal at the same time as the first signal, and then a second signal only. The gates and inverters are conventional NAND gates which may have any number of inputs. When any one of the inputs to a NAND gate is at a logic 0, the output of the NAND gate is a logic 1. When all of the inputs of the NAND gate are at a logic 1, the output of a NAND gate is a logic 0. The flip-flops are conventional JK flip-flops which have logic inputs J and K, a trigger input T, and a Q output. (The flip-flops also have a $\overline{Q}$ output, but these are not utilized in this embodiment of my invention.) The output of the scanner S1 is applied to one of the inputs of the gates G1A, G1B, and the output of the scanner S1' is applied to one of the inputs of the gates G1A', G1B'. The output of the gate G1A is applied to the other inputs of the gates G1A', G1B, and the output of the gate G1A' is applied to the other inputs of the gates G1A, G1B'. The outputs of the gates G1B, G1B' are applied to the J inputs of their respective flip-flops FF1, FF1', and are applied through the inverters I1, I1' to the K inputs of the flip-flops FF1, FF1'. The outputs of the inverters I1, I1' are respectively applied to one of the inputs of the gates G1C, G1C'. The Q outputs of the flip-flops FF1, FF1' are respectively applied to the second inputs of the gates G1C, G1C'. Finally, the circulating shift register output P1 is connected to the trigger inputs T of the flip-flops FF1, FF1' and to the third inputs of the gates G1C, G1C'.

The logic elements and connections in other two dashed line rectangles for locations 2 and 3 are identical to those for location 1, and are given corresponding designations.

Two common output gates G–ON, G–OFF are also provided. These are also NAND gates, and have three inputs, one for each of the locations. The outputs from the gates G1C', G2C', G3C' are applied to the inputs of the gate G–ON; and the outputs from the gates G1C, G2C, G3C are applied to the inputs of the gate G–OFF. Outputs from the gates G–ON, G–OFF are respectively designated on and off signals, and these signals can be utilized in any desired manner, such as in an up or down counter.

Figure 2:
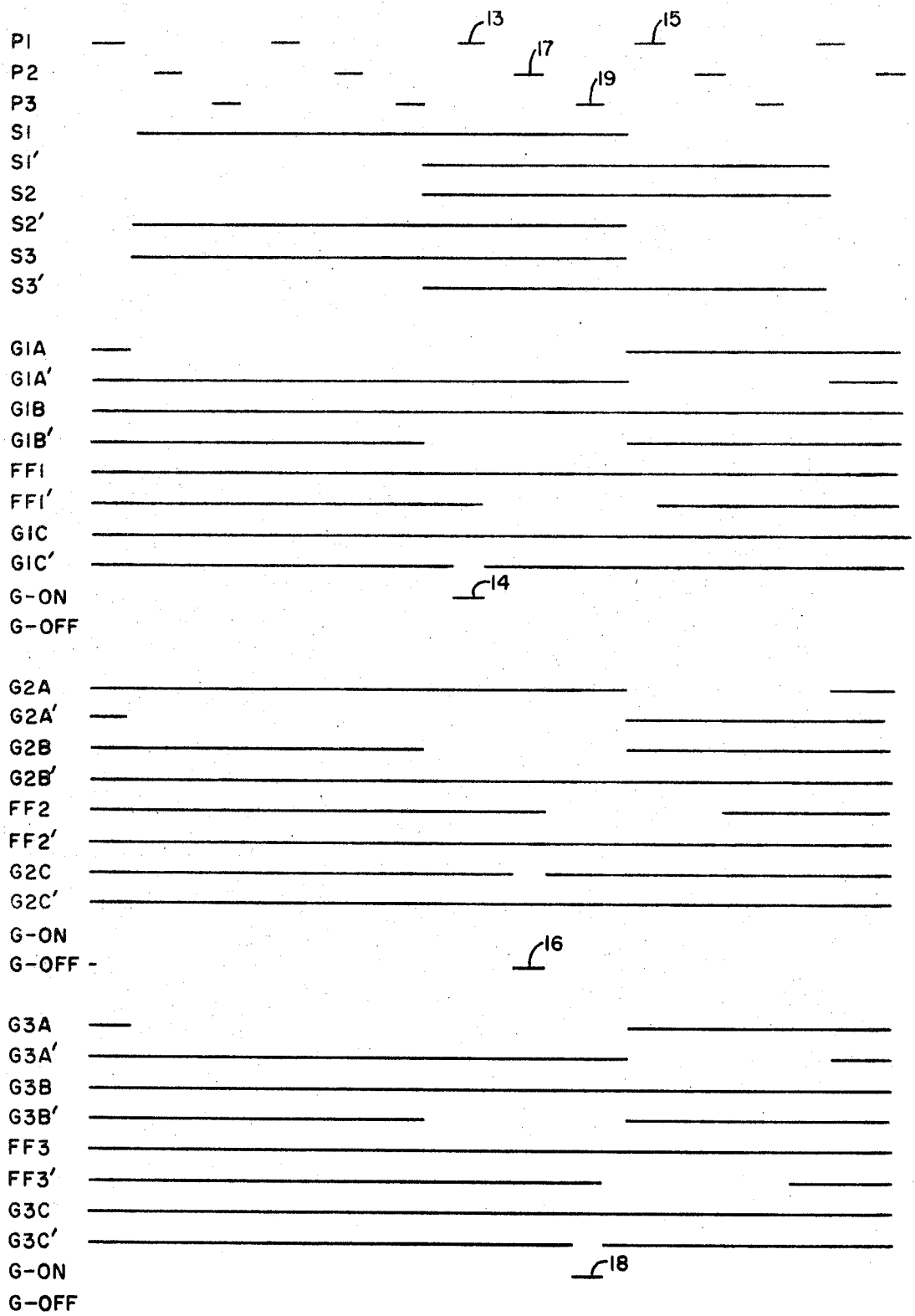
FIG. 2 shows a logic timing diagram illustrating the operation of my counting system.

The operation of my counting system of FIG. 1 will be explained in connection with the logic timing diagram shown in FIG. 2. In this explanation, I have assumed that the system is being used on a bus, and that the scanners are arranged with the scanners S1, S2, and S3 positioned outwardly at each location, and with the scanners S1', S2', S3' positioned inwardly at each location. Thus, at location 1, a person getting on the bus will pass the scanner S1 and then the scanner S1'; and a person getting off the bus at location 1 will pass the scanner S1' and then the scanner S1. The same is true for locations 2 and 3. As mentioned earlier, the scanners at each location are positioned sufficiently close together so that a person or object is in front of both scanners at the same time for a short period. Also, in this explanation, I have assumed what I believe to be one of the worst possible operating conditions, namely that passengers or people pass the scanners at locations 1, 2, and 3 at identical times, getting on the bus at locations 1 and 3 and getting off the bus at location 2. The diagrams of FIG. 2 are outputs from selected elements of FIG. 1, with the outputs being designated with the same legend as their corresponding or respective elements in FIG. 1. In the diagrams, a logic 1 is indicated by the presence of a horizontal line, and a logic 0 is indicated by the absence of any line.

Beginning at the time T0, I have assumed that no one is in front of a scanner. Hence, all of the scanner outputs (S1, S1', S2, S2', S3, S3') are at a logic 0. The shift register outputs P1, P2, P3 are being sequentially produced. With a logic 0 being produced by the scanners S1, S1', each of the gates G1A, G1A', G1B, G1B' produces a logic 1. Thus, a logic 1 is respectively applied to the J inputs of the flip-flops FF1, FF1', so that these flip-flops, FF1, FF1' are set and the Q outputs are also at a logic 1. The logic 1 applied to the inverters I1, I1' is inverted to a logic 0, so that each of the gates G1C, G1C' produces a logic 1. In a similar manner, each of the gates G2C, G2C', G3C, G3C' produces a logic 1, so that the output gates G–ON and G–OFF have a logic 1 at each of their inputs. Hence, each of the output gates G–ON, G–OFF produces a logic 0 at its output.

At the time T1, I have assumed that a person gets on the bus at location 1, and passes the outer scanner S1. This causes the scanner S1 to produce a logic 1. The output of the gate G1A' is a logic 1, so that the two inputs of the gate G1A are both a logic 1, and the output of the gate G1A switches to a logic 0. This logic 0 is supplied to an input of the gate G1A' to close the gate G1A' so it does not pass signals from the scanner S1'.

Nothing further happens until the time T2, when I have assumed that the same person now passes in front of the inner scanner S1'. The scanner S1' produces a logic 1, but this has no effect on the gate G1A', since the other input of the gate G1A' is at a logic 0. That is, the gate G1A' is closed or in a blocking condition. However, this logic 1 is applied directly to an input of the gate G1B', along with the logic 1 output from the gate G1A', so that both inputs to the gate G1B' are now at a logic 1. Hence, the output of the gate G1B' switches to a logic 0. This logic 0 is inverted to a logic 1 by the inverter I1', so that a logic 1 is applied to the K input of the flip-flop FF1'. This logic 1 is also applied to the gate G1C'. Another input of the gate G1C' is supplied with a logic 1 from the Q output of the flip-flop FF1', so that the only input to the gate G1C' which is at a logic 0 is supplied by the shift register output P1.

At the time T3, the shift register output P1 becomes a logic 1, as indicated by the pulse 13. At this time, and until the time T4 when the output P1 returns to a logic 0, all inputs to the gate G1C' are at a logic 1. The gate G1C' produces a logic 0 count signal at its output, as indicated. This logic 0 is applied to the gate G–ON, so that the gate G–ON produces a logic 1 output (as indicated by the pulse 14) which is utilized as a passenger-on signal. This passenger-on signal may be applied to the up-down counter mentioned, and used in the counter to indicate that one passenger has gotten on the bus.

At the time T4, the output P1 returns to a logic 0 which causes the gate G1C' to produce a logic 1 output. So again, all inputs to the gate G–ON are again at a logic 1. Hence, the output of the gate G–ON returns to a logic 0 condition. Thus, it will be seen that the G–ON pulse 14 exists only for the same time duration as the pulse 13 at the output P1.

Also at the time T4, when the trailing edge of the pulse 13 of the output P1 returns to a logic 0, this logic 0 provides the requisite trigger signal to the trigger input T of the flip-flop FF1'. The inverter I1' was previously supplying a logic 1 (derived from the logic 0 produced by the gate G1B') to the K input of the flip-flop FF1', so that this trigger signal causes the flip-flop FF1' to switch to a reset condition in which its Q output produces a logic 0.

Nothing further happens at location 1 until the time T9, when I have assumed that the person getting on the bus at location 1 passes beyond the outer scanner S1. Hence, the scanner S1 signal returns to a logic 0 which causes the gate G1A to again produce a logic 1 output. Thus, both inputs to the gate G1A' are at a logic 1. The gate G1A' produces a logic 0 which causes the gate G1B' to produce a logic 1 again. This logic 1 is applied to the J input of the flip-flop FF1'.

However, the flip-flop FF1' remains in its reset condition until the time T10 when the trailing edge of a pulse 15 of the output P1 returns to a logic 0 to trigger the flip-flop FF1' at its trigger input T. This causes the flip-flop FF1' to return to its set condition with the Q output again at a logic 1. Thus, while the flip-flop FF1' was reset (its Q output at logic 0), it served as a lockout device to prevent the gate G1C' from producing a logic 0, as it otherwise might in response to a transient pulse between the times T4 and T9 when the signal from the scanner S1 ends.

Nothing further happens at location 1 until the time T13, when I have assumed that the person getting on the bus passes beyond the inner scanner S1' so that this scanner S1' again produces a logic 0. This logic 0 causes the gate G1A' to produce a logic 1 so that all circuit elements at location 1 are returned to the same condition which they had at the time T0.

A similar operation can be followed for the logic circuits at locations 2 and 3 using the timing diagram of FIG. 2. The operation at location 2 is different in that an off signal 16 is produced by the gate G–OFF, since a passenger got off the bus and passed the inner scanner S2' and then the outer scanner S2. This off signal 16 is produced between the time T5 and the time T6 when a pulse 17 is produced by the output P2. At location 3, an on signal 18 is produced between the time T7 and the time T8 when a pulse 19 is produced by the output P3.

It will thus be seen that appropriate on or off signals are supplied from the three locations at separate times, because of the sequential and separate shift-register outputs P1, P2, P3. This feature assures a complete and accurate count, even under the worst possible condition, namely people getting on and off the bus under identically simultaneous conditions and times.

It will thus be seen that I provide a new and improved counting system that is particularly useful under crowded and adverse conditions, such as would exist on a public transportation bus. My system is accurate and provides information in a form that can be used by a dispatcher in conjunction with a computer, along with time of day and route information, so as to schedule transportation facilities in real time (i.e., quickly to meet some unusual circumstances), or on a long-range basis (i.e., where populations shift or change to other modes or routes of transportation). While I have shown only one embodiment of my invention, persons skilled in the art will appreciate that modifications may be made to the system shown. For example, my invention can be used in all sorts of applications. Various types of arrangements may be used to generate the sequential pulses used at the outputs P1, P2, P3. Different logic elements, such as AND or NOR gates may be used with appropriate modification. In addition, my system can be used with almost any number of locations, provision only having to be made to provide the output gates G–ON, G–OFF with the appropriate number of inputs and to provide the appropriate number of sequential pulses. Various arrangements of the scanners may be utilized, as long as both scanners sense the presence of the person or object at the same time for some duration that covers a full sequence of the sequential pulses. In locations where people move in one direction, only one scanner is needed. This scanner is connected directly to one gate (such as G1A) and is connected through a time delay circuit to the other gate (G1A') to give the effect of movement in the one direction past two scanners. And, various time durations and frequencies can be provided for the sequential pulses, depending upon the speed of operation of the circuit elements and logic components. Therefore, while my invention has been described with reference to a particular embodiment, it is to be understood that modifications may be made without departing from the spirit of the invention or from the scope of the claims.

What I claim as new and desire to secure by U. S. Letters Patent is:

1. An improved system for indicating the direction of passage of an object past a location having first and second presence sensors arranged so that a passing object causes said sensors to produce respective signals in an overlapping sequence, said system comprising:

a. first and second input terminals for receiving signals from first and second sensors respectively;
   b. first and second gates having inputs connected to said first and second input terminals respectively and having outputs;
   c. means interconnecting said first and second gates so that each gate, when passing sensor signals, prevents the other gate from passing sensor signals;
   d. third and fourth gates having first inputs connected to said outputs of said first and second gates respectively, having second inputs connected to said first and second input terminals respectively, and having outputs at which signals are produced in response to the respective one of said first and second gates being closed and in response to the presence of a sensor signal at the respective second inputs;
   e. and fifth and sixth gates having inputs connected to said outputs of said third and fourth gates respectively, having further inputs for receiving trigger signals, and having outputs at which count signals are produced in response to signals from said third and fourth gate outputs respectively and during a trigger signal.

2. The improved system of claim 1, and further comprising lock-out means connected between said third gate output and an input to said fifth gate and between said fourth gate output and an input to said sixth gate respectively for preventing production of further count signals in response to a respective signal from said outputs of said third and fourth gates and until termination of the first sensor signal of a sequence.

3. The improved system of claim 1, and further comprising an up-down counter connected to said fifth and sixth gate outputs.

4. The improved system of claim 1, and further comprising lock-out means connected between said third gate output and an input to said fifth gate and between said fourth gate output and an input to said sixth gate respectively for preventing production of further count signals in response to a respective signal from said outputs of said third and fourth gates and until termination of the first sensor signal of a sequence; and an up-down counter connected to said fifth and sixth gate outputs.

5. An improved arrangement for counting people getting on and off buses and the like at a plurality of locations, said arrangement comprising:
   a. a source of repetitive pulses;
   b. means connected to said source for supplying an individual pulse from said source in a repetitive sequence at each of a plurality of outputs;

And, at each of said locations at which people get on and off, said arrangement further comprising:
   c. first and second spaced scanners, each of which produces a signal in response to the presence of a person at the scanner;
   d. first and second gates, each having first and second inputs and an output;
   e. means connecting said first inputs of said first and second gates to said first and second scanners respectively;
   f. means connecting said output of said first gate to said second input of said second gate and said output of said second gate to said second input of said first gate so that when one of said gates is open, it causes the other of said gates to be closed;
   g. third and fourth gates each having first and second inputs and an output;
   h. means connecting said first inputs of said third and fourth gates to said outputs of said first and second gates respectively so that when either of said first and second gates is closed, it causes said third and fourth gates respectively to be open;
   i. means connecting said second inputs of said third and fourth gates to said first and second sensors respectively for producing count signals at their respective outputs in response to both the gate being open and a scanner signal;
   j. fifth and sixth gates, each having first, second, and third inputs and an output;
   k. means connecting said first inputs of said fifth and sixth gates to said outputs of said third and fourth gates respectively;
   l. means connecting said second inputs of said fifth and sixth gates to one of said pulse source outputs;
   m. and first and second lockout means connected between said third and fourth gate outputs and said third inputs of said fifth and sixth gates respectively, said lockout means being connected to said one pulse source for closing said fifth and sixth gates in response to a pulse from said one pulse source output and a count signal at the respective third and fourth gates, and for opening said fifth and sixth gates in response to the termination of the earlier of said scanner signals in a sequence followed by the presence of a subsequent pulse from said one pulse source output.

6. The improved arrangement of claim 5 wherein, at each of said locations, said first and second scanners are spaced so that said scanner signals are produced simultaneously for at least a part of their respective durations in response to a person passing by said scanners.

* * * * *